United States Patent
Zafarullahkhan et al.

(10) Patent No.: US 12,063,713 B2
(45) Date of Patent: Aug. 13, 2024

(54) SYSTEM OF MOBILE DEVICE OPERATING SYSTEM AND APPS DELIVERY SERVICE

(71) Applicants: Mehmood Zafarullahkhan, Torrance, CA (US); Manish Bodhankar, Seattle, WA (US); Mingyang Chai, Los Angeles, CA (US)

(72) Inventors: Mehmood Zafarullahkhan, Torrance, CA (US); Manish Bodhankar, Seattle, WA (US); Mingyang Chai, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 488 days.

(21) Appl. No.: 17/324,270

(22) Filed: May 19, 2021

(65) Prior Publication Data

US 2022/0377533 A1 Nov. 24, 2022

(51) Int. Cl.
*G06F 8/65* (2018.01)
*H04W 8/24* (2009.01)

(52) U.S. Cl.
CPC .............. *H04W 8/245* (2013.01); *G06F 8/65* (2013.01)

(58) Field of Classification Search
CPC ................................. H04W 8/245; G06F 8/65
See application file for complete search history.

(56) References Cited

U.S. PATENT DOCUMENTS

| | | | | |
|---|---|---|---|---|
| 8,145,940 B1* | 3/2012 | Wang | ................... | G06F 21/57 |
| | | | | 714/6.1 |
| 8,418,168 B2* | 4/2013 | Tyhurst | ................... | G06F 8/65 |
| | | | | 717/173 |
| 9,262,366 B2* | 2/2016 | Lenzmeier | .............. | G06F 15/16 |
| 9,430,225 B2 | 8/2016 | Ko | | |
| 10,146,524 B1* | 12/2018 | Killmon | .................... | G06F 8/65 |
| 2005/0289533 A1* | 12/2005 | Wang | ..................... | G06F 21/57 |
| | | | | 707/999.203 |
| 2007/0294685 A1 | 12/2007 | Oh | | |
| 2009/0300596 A1* | 12/2009 | Tyhurst | .................... | G06F 8/65 |
| | | | | 717/173 |

(Continued)

FOREIGN PATENT DOCUMENTS

CA 2679129 A1 3/2011

OTHER PUBLICATIONS

International Search Report and Written Opinion for International Application No. PCT/US2022/029190, dated Aug. 31, 2022 (Aug. 31, 2022)—14 pages.

*Primary Examiner* — Kenneth T Lam
(74) *Attorney, Agent, or Firm* — Culhane PLLC; Stephen J. Weed (57) ABSTRACT

A system of mobile device operation system and apps delivery is disclosed. All updates of the mobile device including system updates and feature apps updates are delivered over-the-air ("OTA"). When a system update is available, it is delivered to the mobile device for download and installation. If feature apps updates are available but a system update is not available, the system delivers the feature apps updates to the mobile device for download and installation. Feature apps updates coming from the two different routes are stored in different partitions of the OS image on the mobile device for version control. Feature apps updates included in subsequent system updates takes precedent over previously installed updates of the same or earlier versions.

17 Claims, 7 Drawing Sheets

(56) References Cited

U.S. PATENT DOCUMENTS

| | | | |
|---|---|---|---|
| 2011/0113414 A1* | 5/2011 | Ewington | G06F 8/658 |
| | | | 382/218 |
| 2016/0054990 A1* | 2/2016 | Qin | G06F 8/65 |
| | | | 717/169 |
| 2016/0294605 A1* | 10/2016 | Searle | H04L 41/069 |
| 2016/0294614 A1* | 10/2016 | Searle | H04L 67/34 |
| 2020/0334304 A1* | 10/2020 | Reddy Vennapusa | |
| | | | G06F 16/2379 |
| 2021/0075631 A1* | 3/2021 | Liao | H04W 4/24 |
| 2021/0279052 A1* | 9/2021 | Nabar | G06F 9/30094 |

* cited by examiner

SYSTEM OF MOBILE DEVICE OPERATING SYSTEM AND APPS DELIVERY SERVICE

TECHNICAL FIELD

This disclosure relates to a system of software delivery service. More specifically, this disclosure relates to a system of mobile device operating system and apps delivery service supporting both internal development teams and external users.

BACKGROUND OF THE INVENTION

Mobile devices are now ubiquitous. The software running on the mobile device, including the operation system ("OS") and the applications, often need to be updated to provide better and updated functions, patch security flaws, protect user data and so forth. The updates are usually provided by a server to the mobile device over a network.

BRIEF DESCRIPTION OF THE DRAWINGS

The features of the present disclosure will become more apparent to and the subject matter will be better understood by persons of ordinary skill of the art, with reference to the following description of the present disclosure taken in conjunction with the accompanying drawings, wherein.

DETAILED DESCRIPTION

The description that follows includes systems, methods, techniques, instruction sequences, and computing machine program products illustrative of examples of the disclosure. In an example, all updates of a mobile device including system updates and feature apps updates are delivered over-the-air ("OTA"). When a system update is available, it is delivered to the mobile device for download and installation. If feature apps updates are available but a system update is not available, the system delivers the feature apps updates to the mobile device for download and installation. Feature apps updates coming from the two different routes are stored in different partitions of the OS image on the mobile device for version control. Feature apps updates included in subsequent system updates take precedence over previously installed updates of the same or earlier versions.

In the following description, for the purposes of explanation, specific details are set forth in order to provide an understanding of various examples of the subject matter or the present disclosure. It will be evident, however, to those skilled in the art, that examples of the present disclosure may be practiced without these specific details. In general, well-known instruction instances, protocols, structures, and techniques are not necessarily shown in detail.

Figure 1:
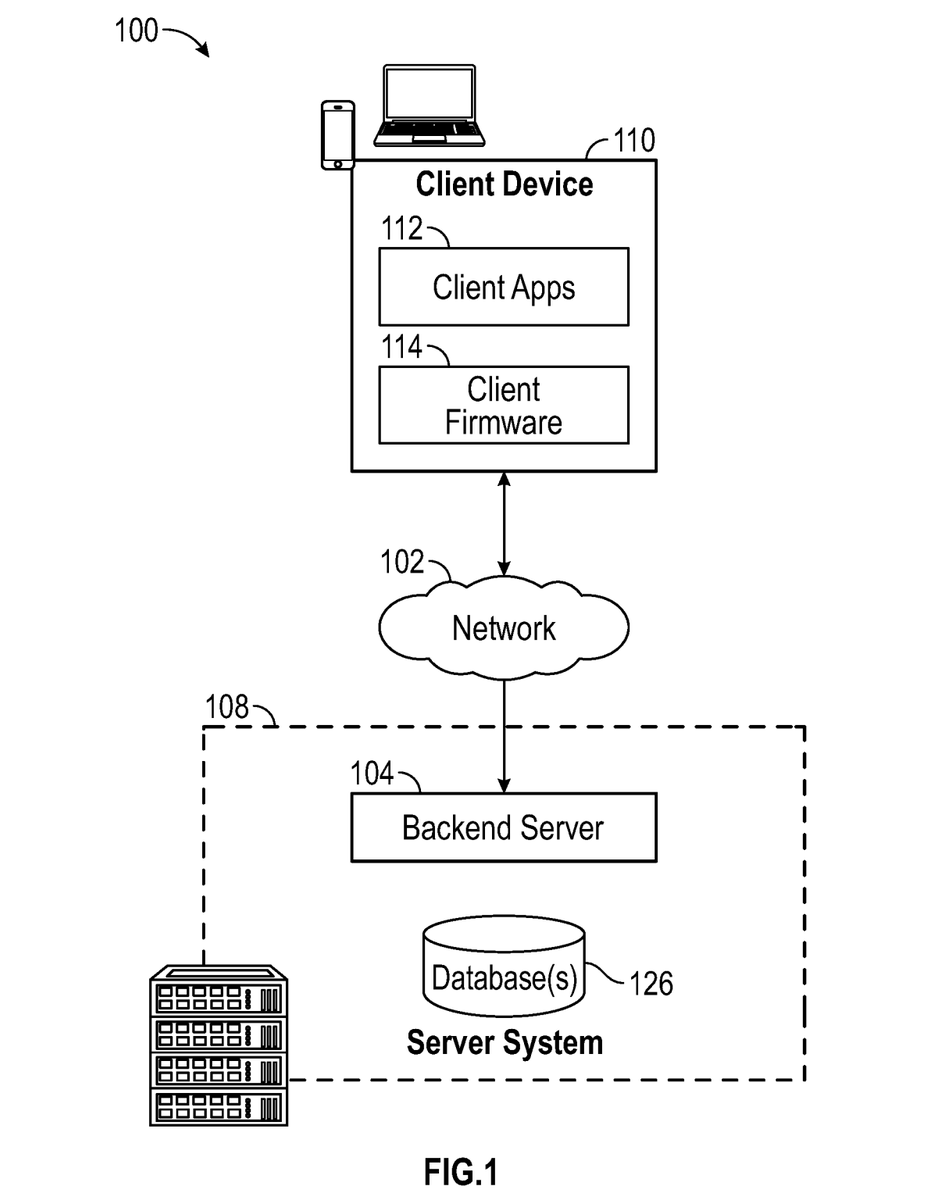
FIG. 1 is a block diagram of a network system in which examples of the present disclosure may be implemented.

FIG. 1 is a block diagram of a network system in which examples of the present disclosure may be implemented. Referring to FIG. 1, the network system 100 includes one or more client devices 110. The client device 110 includes, but is not limited to, a wearable device, smart glass, mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the network system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth.

One or more users may be a person, a machine, or other means of interacting with the client device 110. In examples, the user may interact with the network system 100 via the client device 110 through wired or wireless means. For instance, the user may provide input (e.g., touch screen input or alphanumeric input) to the client device 110 and the input may be communicated to other entities in the network system 100 (e.g., third-party servers, server system 108, etc.) via the network 102. Or the user may be a device connected to the client device 110 through wired or wireless means. The user device may communicate with the client device 110 and have the client device send and receive information on behalf of the user device. In such instances, other entities in the network system 100, in response to receiving the request from the client device 110, may communicate information to the client device 110 via the network 102, which may be relayed to the user device.

The network system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a 3G, 4G, 4G LTE, 5G, 6G network, another type of network, or a combination of two or more such networks.

The client device 110 may access the various data and applications provided by other entities in the network system 100 via one or more client application(s) 112. The one or more client application(s) 112 (also referred to as "apps") may be a web browser, messaging application, electronic mail (email) application, an e-commerce site application, a mapping or location application, an online social media application and the like.

In some examples, one or more client application(s) 112 are included in the client device 110 and are configured to locally provide a user interface and at least some of the functionalities, with the client application(s) 112 configured to communicate with other entities in the network system 100 on an as-needed basis, for data processing capabilities not locally available (e.g., to access location information, to authenticate a user, etc.). Conversely, one or more client application(s) 112 may not be included in the client device 110, and then the client device 110 may use its web browser to access the one or more applications hosted on other entities in the network system 100.

The client device 110 further includes a client operation system ("OS") 114, also known as firmware especially in circumstances where the client device 110 is less complex comparing to general purpose devices. The OS or firmware manages the hardware and software of the client device 110. In the present disclosure, OS and firmware are used interchangeably except where it is clear from the context that the terms are distinct from each other.

A server system 108 provides backend functionality via the network 102 (e.g., the Internet or wide area network (WAN)) to one or more client devices 110. The server system 108 includes one or more backend server(s) 104. Backend servers(s) 104 may be communicatively coupled with one or more database(s) 126. The one or more database(s) 126 may be storage devices that store data related to users of the server system 108, applications associated with the server system 108, cloud services, and so forth. The one or more database(s) 126 may further store information related to client device 110, client application(s) 112, client OS 114, any users of the client device 110, and so forth.

There are many kinds of OS for mobile devices. Android OS is one of the most popular mobile OS. Android is based on open source software sponsored by Google. The source code of the Android OS is known as the Android Open Source Project ("AOSP"), which is licensed under open source license. There are many proprietary software developed based on the AOSP providing functionalities that's not provided by the AOSP. For example, AOSP by itself does not contain Google Mobile Suite ("GMS"), which includes the Google Play platform for digital distribution. Google Play provides service of distributing application packages, or apps, if running on Android, to the mobile device. Without GMS, the apps cannot be downloaded or updated via the Google Play Store services. However, GMS is propriety software and must be licensed if the device developer wants to use its service.

The Android device developer may decide not to license expensive proprietary platforms that they have to pay for. They may choose to create the functionality of software distribution by developing their own platform based on AOSP. In this situation, the device developer needs to develop the software and backend components for managing software releases from its own servers to the mobile device.

Software releases, also known as Over-The-Airs ("OTAs"), are how software is delivered to the mobile devices after the initial factory software installations. The out-of-box mobile device usually comes with the factory provided software that is pre-installed or can be installed directly from a storage medium. For subsequent maintenance and updates of the software, the updates are delivered through OTAs.

There are generally two types of the software updates the present disclosure covers: the updates of the OS and the updates of the feature apps. When a new build of the OS is released, feature apps or app updates developed by the same company, or first party apps, that are ready to deploy may be bundled with the new OS build for release. But when a new build of a feature app is available, there might not be any new OS being planned or the new OS is still in the pipeline.

The OS plus feature app update may also be called a system update. When having a system update, the entire system image overwrites the system partition of the mobile device. In the system update the bundled first party is also stored in the system partition as the previous system partition is overwritten. On the other hand, an update of an app only involves one application package, which is on a much smaller scale compared to the system update. Further, the amount of time needed for the development cycle of the system updates and the app updates are different. Based on those observations, the present disclosure provides a system for OTA software releases that supports quick and efficient system updates and app updates having different release cycles, or cadence.

The OS, or firmware, development and feature apps development are usually assigned to different teams of engineers. Whereas the firmware teams' expertise focuses on lower level of the mobile device's system architecture, the features apps teams focus on higher levels. The feature apps must be supported by the version firmware it runs on. Conversely the firmware may also be affected by the feature apps that run on it. The interaction and interdependence of the firmware and the feature apps in the updating process are complex and present one of the major issues for system stability.

Figure 2:
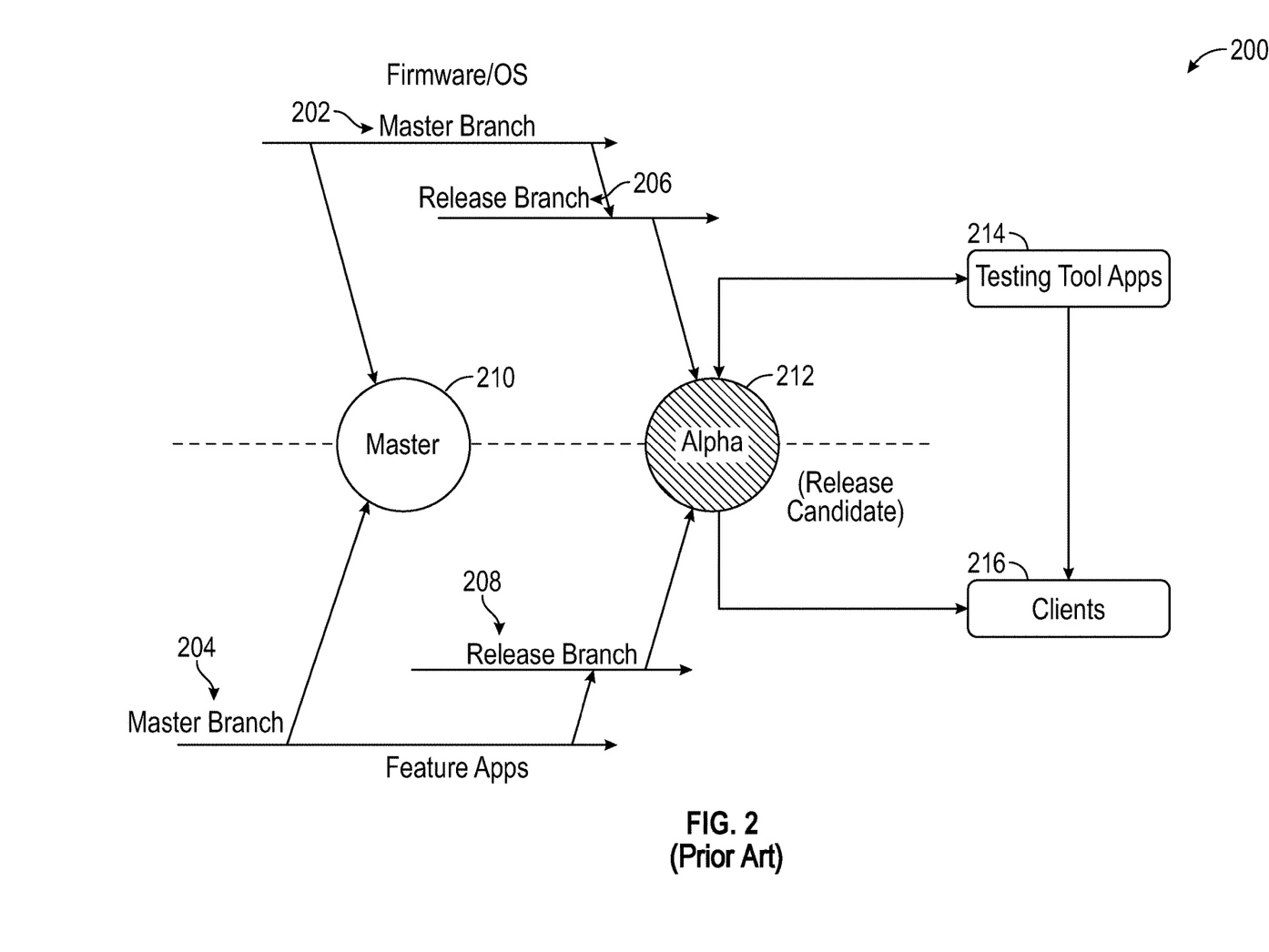
FIG. 2 illustrates the software development pipeline for system update in the prior art.

In the prior art basic AOSP system devoid of distribution platform such as the GMS, the OS and the apps are all through the system update. FIG. 2 illustrates the pipeline of the system update of the prior art. Referring to FIG. 2, two master branches of software are being maintained and developed by two groups of engineering teams. The firmware master branch 202 represents the branch for the firmware development. The feature apps master branch 204 represents the branch for feature apps development. One or more engineering teams may work on each of the branches, in which case their work is aggregately represented in one of the branches they belong to as illustrated in FIG. 2.

The branches described in the present disclosure, including the master branches, release branches and other branches, are Git branches. Git is a well-known and broadly used source code management tool in the software industry for version control. It tracks changes in the source codes, enhances data integrity, speeds up software development cycle and promotes collaboration among programmers. In Git, the master branch is where all other branches directly or indirectly spawn from. A branch is a copy of the code of another branch at the branching point. When adding new features or fixing bugs, a programmer may spawn a new branch from the codes that they want to modify and merge the changes back to the original branch after the codes are tested and stable. Any problems occurring during the modification will be encapsulated in the new branch and wouldn't spread to the original branch before the merge back. Branching is a version control technique that makes it harder for unstable codes to spread into the code base.

In the broadly adopted Git workflow as a best practice, several named branches are used in conjunction for version control, such as the master branch, develop branch, feature branch, release branch etc. The master branch is where the release history of the main code base is maintained in the Git repository. Other branches are created in part to ensure the stability of the master branch. Of importance to the present disclosure, the release branch is the starting point of a new release cycle where code release-oriented tasks take place. It is a dedicated branch to prepare for software release where no new features are added. The release branch may be branched out of other branches where the features for the new release are completed. After the release is complete, the codes in the release branch will be merged back to the master branch and the release branch is usually deleted thereafter.

Referring back to FIG. 2, on a center line where the codes of the branches from the teams are pulled together, a master stage 210 and an alpha stage 212 are illustrated therein. Stages are nodes on the pipeline of the software release life cycle during which the software is being developed and gaining maturity from initial development to eventual release. The codes go from one stage to the next via promotion. Each stage has a set of stage promotion criteria. Promotion may occur when the stage passes stage promotion criteria for the stage. The stage promotion criteria represent a set of measurable outcomes that can be monitored during the release cycle. The goal is to generate software releases that maintain high quality, engaging customer experiences for the users. The stage promotion criteria may include automation test pass, QA manual test pass, OS and application package size regression tests, metric-collection, bug-reporting, crash-reporting, feedback collected from alpha and beta testers described below and so forth. The successive promotion ensures the gradual progression of the software in its life cycle which facilitates consistent high quality software releases.

The codes developed by the firmware teams and the feature apps need to put together to see if they work. In the master stage 210, the firmware master branch 202 and the feature apps master branch 204 are integrated. If successful, the stage will be promoted from the master stage 210 to the alpha stage 212, and the release branches for the firmware and feature apps may be spawned. Similarly, the firmware release branch 206 and the feature apps release branch 208 are integrated in the alpha stage 212. The integrated codes in alpha stage 212 are also called release candidates as they are tested in this stage for the purpose of release. In the alpha stage 212, the software is released to alpha clients 216 for testing. The testers are first party testers who are from within the company where the software is being developed. In the alpha stage test, client testing tools 214 may be deployed to the first party testers to facilitate the testing. After successful testing, the codes will be further promoted to the next stages until the final release, which are currently omitted from FIG. 2.

In the prior art software release pipeline illustrated in FIG. 2, the integrated codes in stage 210 and 212 respectively are usually tested with automated tests. The codes are automatically cooled when the tests pass. But the automatic tests are usually not thorough enough for coverage, which may cause all kinds of problems down in the pipeline. Bugs or other imperfections in the application packages of the feature apps may break the firmware master and release branches and vice versa. Furthermore, in the alpha test stage 212, it is challenging for the first party testers to directly consume the alpha build of the software especially for those who are not familiar with retrieving, installing and testing software OTA without the aid of the consumer level apps such as the Google Play Store.

Figure 3:
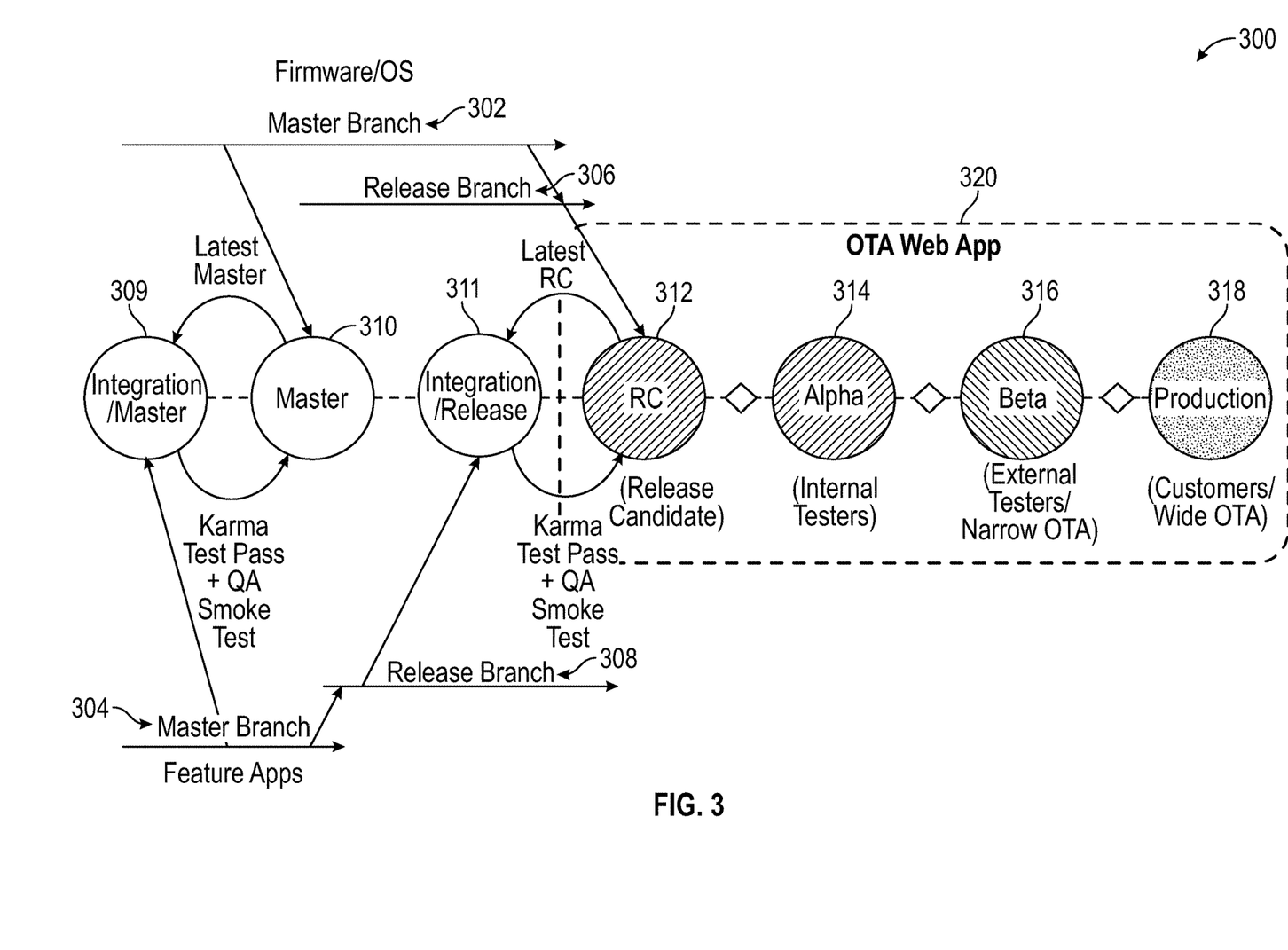
FIG. 3 illustrates the software development pipeline for system updates according to an example of the present disclosure.

The present disclosure improves over the prior art and provides a system of mobile device OS and apps delivery service. FIG. 3 illustrates an example of the present disclosure. Referring to FIG. 3, several new stages are added or illustrated to the pipeline in comparison with FIG. 2. First, there are two new stages before the release candidate ("RC") stage 312—the integration/master stage 309 preceding the master stage 310 and the integration/release stage 311 preceding the RC stage 312. Further, more stages are illustrated after the RC stage 312, namely the alpha stage 314, the beta stage 316 and the release stage 318. Whereas in the prior art illustrated in FIG. 2 the RC stage and the alpha stage coincide in the same stage 212, the RC stage 312 and the alpha stage 314 are two distinctive stages in the present disclosure. Hereinafter, stages 309, 310, 311 and 312 may be collectively referred to as pre-alpha stages, whereas stages 314, 316 and 318 may be collectively referred to as release stages.

Referring to the pre-alpha stages, the newly added integration/master stage 309 is a pre-master stage, wherein the application packages from the feature apps master branch 304 is tested in conjunction with the latest firmware build from the firmware master branch 302. Therefore, instead of integrating the latest firmware and feature apps codes directly when they become available, the integration/master stage 309 provides a stage where the software builds can be integrated for testing before being promoted to the master stage 310. If there are any bugs or any crashes happen, the ensuing damages can be encapsulated in the integration/master stage 309 and not spread to the master stage 310. As such, the master stage 310 his more stable and robust than in the prior art.

At the integration/master stage 309, various tests may be run. In addition to the automatic tests provided for in the prior art, the present disclosure also discloses using manual tests, usually conducted by specialized quality assurance ("QA") engineers. The QA engineers may manually start various "smoke tests" to check the stability of the build. Upon successful testing, the QA team may manually cool the PR and merge the tested codes back to the master branches 302 and 304 respectively. If the automated tests and/or QA initiated smoke tests fail, the firmware team, the feature apps team and the QA team work together to fix the problem. After fixing all the issues, passing the test and meeting all stage promotion criteria, the codes may be promoted from the integration/master stage 309 to the master stage 310.

Similarly, the newly added integration/release stage 311 is a pre-release stage, wherein the application packages from the feature apps release branch 308 are tested in conjunction of the latest codes from the firmware release branch 306. Also similarly, instead of integrating the latest firmware and feature software builds directly when they become available, the integration/release stage 311 provides a stage where the software builds can be integrated for testing before being promoted to the RC stage 312. If there are any bugs or if any crashes happen, any ensuing damages can be encapsulated in the integration/release stage 311 and would not spread to the release stage 312. As such, the release stage 312 is more stable and robust than in the prior art as well.

Also similarly, at the integration/release stage 311, various tests may be run automatic by the system and/or manually by QA engineers, who would also manually cool the code. If the tests fail, the firmware team, the feature apps team and the QA team again work together to fix the problem. After fixing all the issues, passing the test and meeting all stage promotion criteria, the codes may be promoted from the integration/release stage 311 to the RC stage 312.

As the software builds get promoted over the pre-alpha stages, they are tested, revised and ready for release at RC stage 312. Reaching the RC stage means the codes are ready to be tested by users. In the release stages, the software builds go through alpha and beta testing stages and eventually reach the production stage where the software builds are deployed to all qualified users.

Entering the release stages, an OTA Web App 320 creates a Version Set for the build, which tracks the version of the build and distinguishes it from other builds. The Version Set, also known as tag in the prior art, is a data object that represents a "named set" of all applications and other binaries with their versions that form the entire OS image. The OS image is a file that contains the OS, the executables of apps, and any data file that might be related to the OS. The OS image contains one or more partitions where files can be stored. According to an example of the present disclosure, the Version Sets are maintained at the backend of the OS update and feature apps delivery system described in more detail in FIG. 4. The Version Set can also be taken as one of the release stages in the pipeline of FIG. 3. The system may restrict the access to the Version Sets. For programmers, for quality assurance (QA) and program management (PM), they can point their device to any build of the Version Sets and download the corresponding builds that have been published to these stages. On the other hand, users in in the release stages may only download the latest build that has been published on the Version Set.

Referring back to FIG. 3, the alpha stage 314, or an OTA backend stage, is where the first party alpha testers test the software build. The testers at stage 314 are first party alpha testers, or internal testers, who subscribe to the Version Set at the OTA backend. The devices have on-device OTA client communicating with the OTA backend servers. The first party testers install the latest OS version that has been promoted the Version Set using the on-device OTA client and conduct the alpha test. When the alpha stage satisfies the stage promotion criteria upon successful testing, the software build will be promoted to the beta stage.

The beta stage 316 is a stage where third party, or external, beta testers conduct their tests. This stage is also called a narrow OTA stage because the software is released to a group of third party users and/or devices that have opted in as beta testers. The OTA client on the device checks in with the OTA backend from time to time. Each time the OTA client on the device checks in with the OTA backend, it receives the latest build that was published to beta stage, if the user had opted-in for being a beta tester.

The release stage 318 is where a version of a build rolls out to all users who qualify for the update. Similar to the alpha-beta stage promotion, once the build in beta stage 316 passes the stage promotion criteria, a QA, PM or Release manager may promote the build from beta to release stage, using the OTA web app. The release stage 318 is called wide OTA, as this OTA is to all customers qualify for the update.

For feature app developers working on a particular app not being bundled into a system update, the number of life cycle stages would be less than illustrated in FIG. 3 and the cadence shorter. For example, all the pre-RC stages related in integration and pre-integrating with the firmware is not necessary. But the apps would still need to go through some or all of the release stages illustrated in FIG. 3 for testing and deployment. The present disclosure discloses a delivery system providing service that supports both the system update and unbundled app update which have different life cycle cadence.

Figure 4:
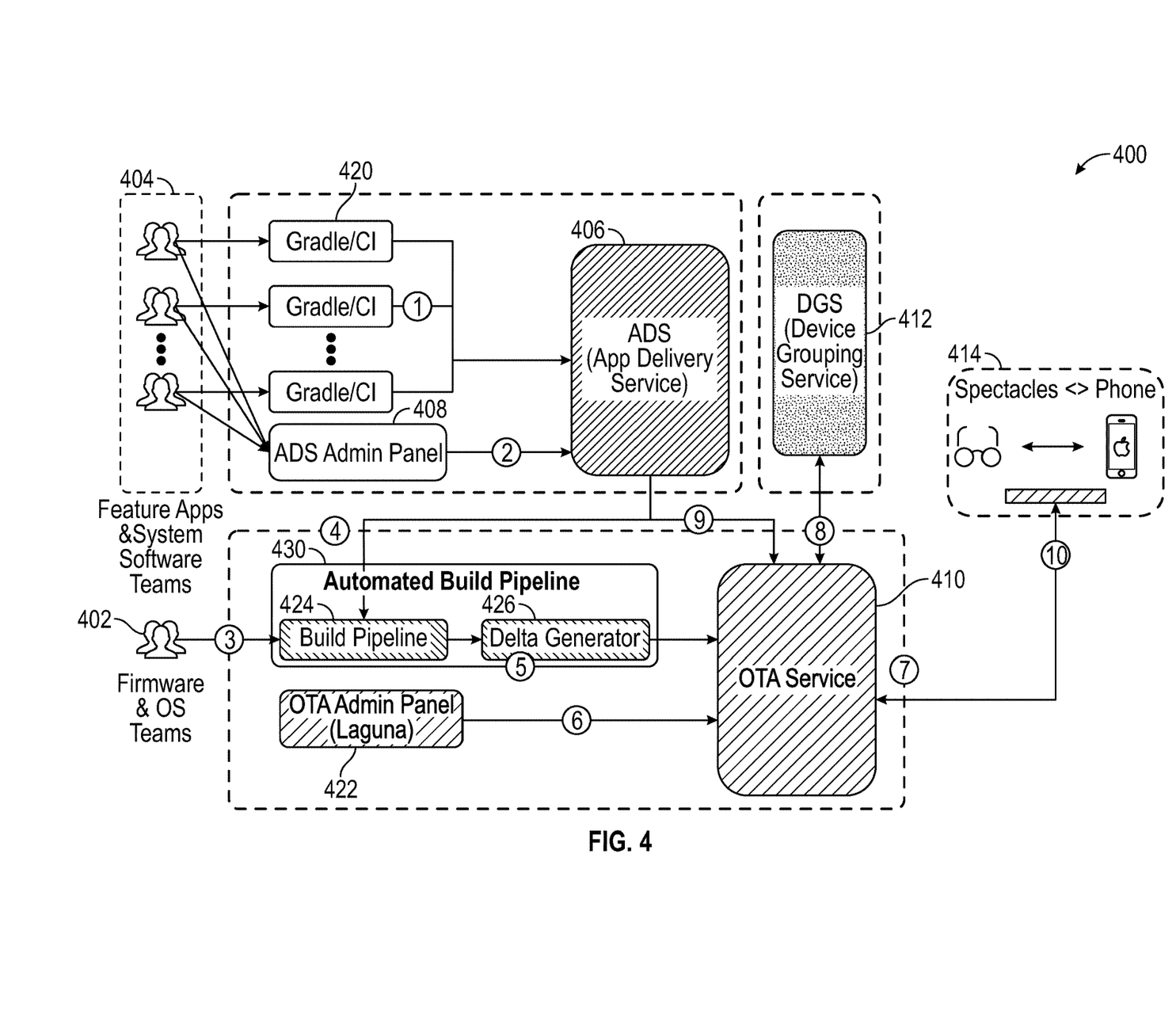
FIG. 4 is a schematic diagram of the system of mobile device operating system and app delivery service according to an example of the present disclosure.

FIG. 4 is a schematic diagram of the OS OTA and app delivery service system ("service system") according to an example of the present disclosure. In FIG. 4, high-level data flows are marked from 1 to 10 in circles. The numbers used herein, however, do not necessarily indicate any temporal order by which the data flow occurs; neither does it necessarily correspond to any sequence of the data flow, although the numbers are described as "steps". Rather, the steps of data flow of the service system are non-linear and may occur in any logically permissible order simultaneously or sequentially.

Referring to FIG. 4, two teams of developers working on the project are illustrated therein, namely the firmware team 402 and the feature apps teams 404. The feature apps teams 404 may have a number of teams working on a slew of features for the OS. The feature app teams 404 may work in a coordinated manner. They may also simultaneously and/or independently from each other, following cadences of release of the team's own pipeline. When the builds of the feature apps are at the end of their respective pipeline, the developer teams publish them to the system. Before being made available to the app delivery service ("ADS") 406, the builds are first sent to software management tool 420 for preparation and fixing potential issues. For example, if the app has dependencies on apps or software, the software management tool 420 may manage or resolve such issues using tools such as Gradle available from Gradle, Inc. of San Francisco, California.

After processing by the software management tool 420, in Step 1 the feature apps are published into the ADS 406. ADS 406 is a component of the delivery service system that stores and vends the app builds developed by the feature apps team 404 to users 414. In addition to the feature apps codes, the ADS 406 may also store other information regarding the codes, such as the name, the version code and the Version Set name of the application packages and so forth for identification and retrieval purposes.

After the initial publication of the feature apps build to ADS 406, subsequent modifications on the published feature apps may be conducted using the ADS admin panel 408. The ADS admin panel 408 provides an interface between the programmers of the feature apps team and the ADS, via which changes to the feature apps codes and other information may be delivered and stored in the ADS. This process is illustrated in Step 2, in which the feature apps team iterates through the app development cycles, promoting the application packages of the apps through the pipeline described in connection with FIG. 3.

While the feature apps team 404 iterates through the development cycle of those apps, the firmware team 402 iterates through its own cycle of developing a new version of firmware and/or fixing existing bugs. When the firmware build is ready for publication, the codes in binary form will be published to the firmware build pipeline 424 in Step 3. In the OS build pipeline 424, the feature apps that have been published in the ADS 406 may be pulled therefrom to go through the integration and testing stages with the firmware builds for a system update as illustrated in FIG. 3. If the binaries of the system update pass the test cases, in Step 4, the application packages published in step 2 tested therein will be pulled into a production Version Set, which indicates that the application packages are ready to be deployed.

In Step 5, the binaries, or the OS image, from 424 are processed by a delta generator 426, where the differences in the binaries, or delta, between the current version and previous versions built into the Version Set are calculated. The delta is then published to the OTA service 410. OTA service 410 is a gateway of the delivery service system interfacing with the backend service system and the users. The delta image published in OTA service 410 is the downloadable for OTA clients. With Step 5, it may significantly reduce the binary size of the image the client downloads. The client may recover and install the complete image using the download with reference to the system image currently residing on the client. In Step 6, the firmware team 402 iterates through their own development, quality assurance, beta test and production Version Set cycles by promoting the delta image through the pipeline.

From time to time, the mobile device 414 calls the OTA service 410 to check if there are new OS and/or app updates for installation in Step 7. Receiving the inquiry, the OTA service 410 contacts device grouping service ("DGS") 412 to see if this device belongs to a pre-defined group in Step 8. DGS is a component of the delivery service system where the group information of the devices is maintained. Group in this context is used to indicate a collection of entities in the relevant context of the present disclosure. The entities of the group can be either devices or users. Groups can be assigned a single Version Set at a time. Any entity inside a group will be vended the Version Set that is assigned to the group. If a group has not been assigned a Version Set, entities within the group will be assigned the default Version Set. Entities can only be in a single group at a time. The creation of groups and moving entities across groups may be managed through a DGS user interface for those purposes.

Referring back to Step 8, if the client does belong to a pre-defined group, then the DGS returns the Version Set to which the device belongs. In Step 10, an on-device service of the client asynchronously downloads and installs the delta binaries of the Version Set. If it turns out that the device does not belong to any pre-defined group in the DGS service, it indicates that no new versions of OS are supposed to be deployed to the device. Then in Step 9, it will check with ADS 406 if new application packages have been published to production version set in Step 2 above. If there are any, the new application packages may be installed in a partition of the OS image that is different from the partition for system update.

Installing a system update of a new Version Set requires significant downtime, whereas installing the application package requires little to no downtime. Further, the application package updates may have a different pace than the firmware and system updates. To enable feature apps team to deliver updates faster to devices, without having to wait for the next OS OTA to go out, the application package updates can reach the device via two different paths, either using the ADS or being included in the OS builds. Every time an app update passes QA and is ready for publication, it can independently be promoted to production Version Set. Until a new OS update gets promoted to this production Version Set, when the device calls OTA services it gets the app update installed in a user partition on the device. Additionally, the OS builds will pick up the latest application packages versions from the same production Version Set and include them in a different partition. By storing the application packages with or without a pre-defined group into different partitions, the OS may allow the new application packages to take precedence over the older version of the application package stored in the system partition. As such, faster app package cadence is supported by the service delivery system of the present disclosure.

Figure 5:
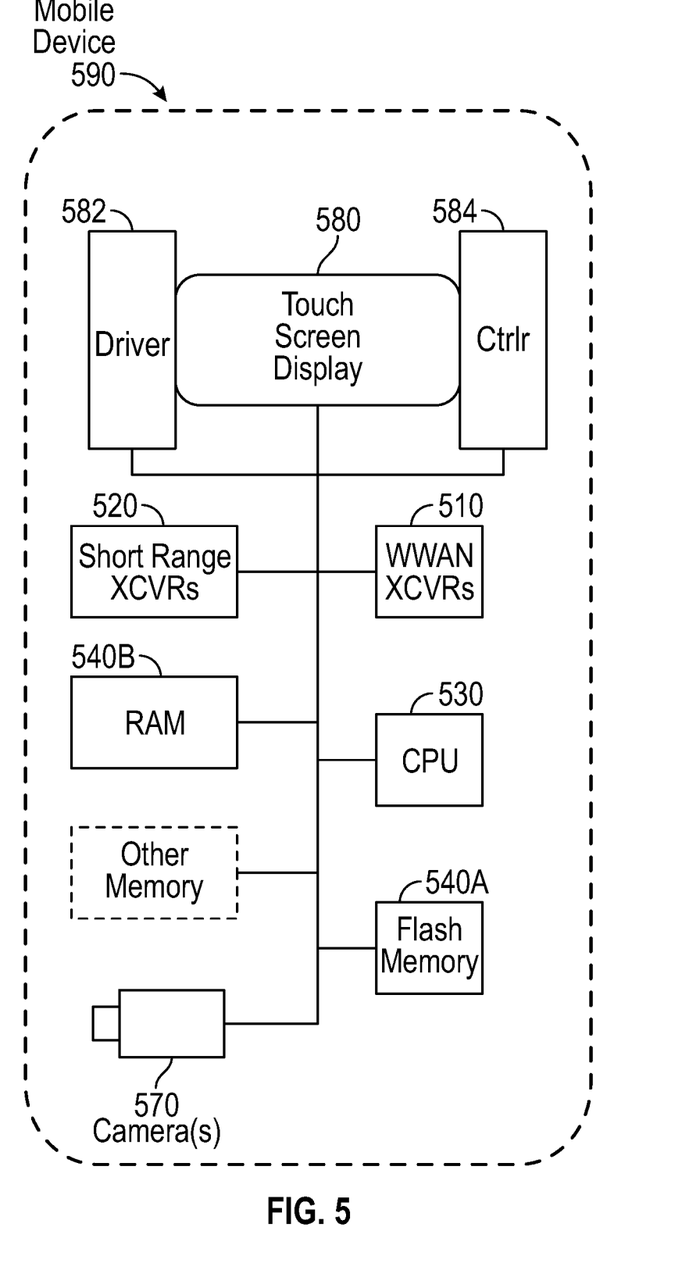
FIG. 5 illustrates a function block diagram of an example hardware configuration for a mobile device within which a portion of the examples of the present disclosure may be implemented.

FIG. 5 is a high-level functional block diagram of an example mobile device. Mobile device includes a flash memory 540A which stores programming to be executed by the CPU 530 to perform all or a subset of the functions described herein.

The mobile device may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device includes an image display 580, a mobile display driver 582 to control the image display 580, and a display controller 584. In the example of FIG. 5, the image display 580 includes a user input layer (e.g., a touchscreen) (not shown) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device with a user interface that includes a touchscreen input layer for receiving input (by touch, multi-touch, or gesture, and the like, by hand, stylus or other tool) and an image display 580 for displaying content.

As shown in FIG. 5, the mobile device includes at least one digital transceiver (XCVR) 510, shown as WWAN XCVRs, for digital wireless communications via a wide-area wireless mobile communication network. The mobile device also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device, the mobile device can include a global positioning system (GPS) receiver. Alternatively, or additionally the mobile device can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conform to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, including 3G, 4G LTE and 5G. For example, the transceivers 510, 520 provide two-way wireless communication of information including digitized audio signals, still image and video signals, web page information for display as well as web-related inputs, and various types of mobile message communications to/from the mobile device.

The mobile device further includes a microprocessor that functions as a central processing unit (CPU); shown as CPU 530 in FIG. 5. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device by configuring the mobile device to perform various operations, for example, in accordance with instructions or programming executable by CPU 530. For example, such operations may include various general operations of the mobile device, as well as operations related to the programming for applications on the mobile device. Although a processor may be configured by use of hard-wired logic, typical processors in mobile devices are general processing circuits configured by execution of programming.

The mobile device includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device, the flash memory 540A is used to store programming or instructions for execution by the CPU 530. Depending on the type of device, the mobile device stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Figure 6:
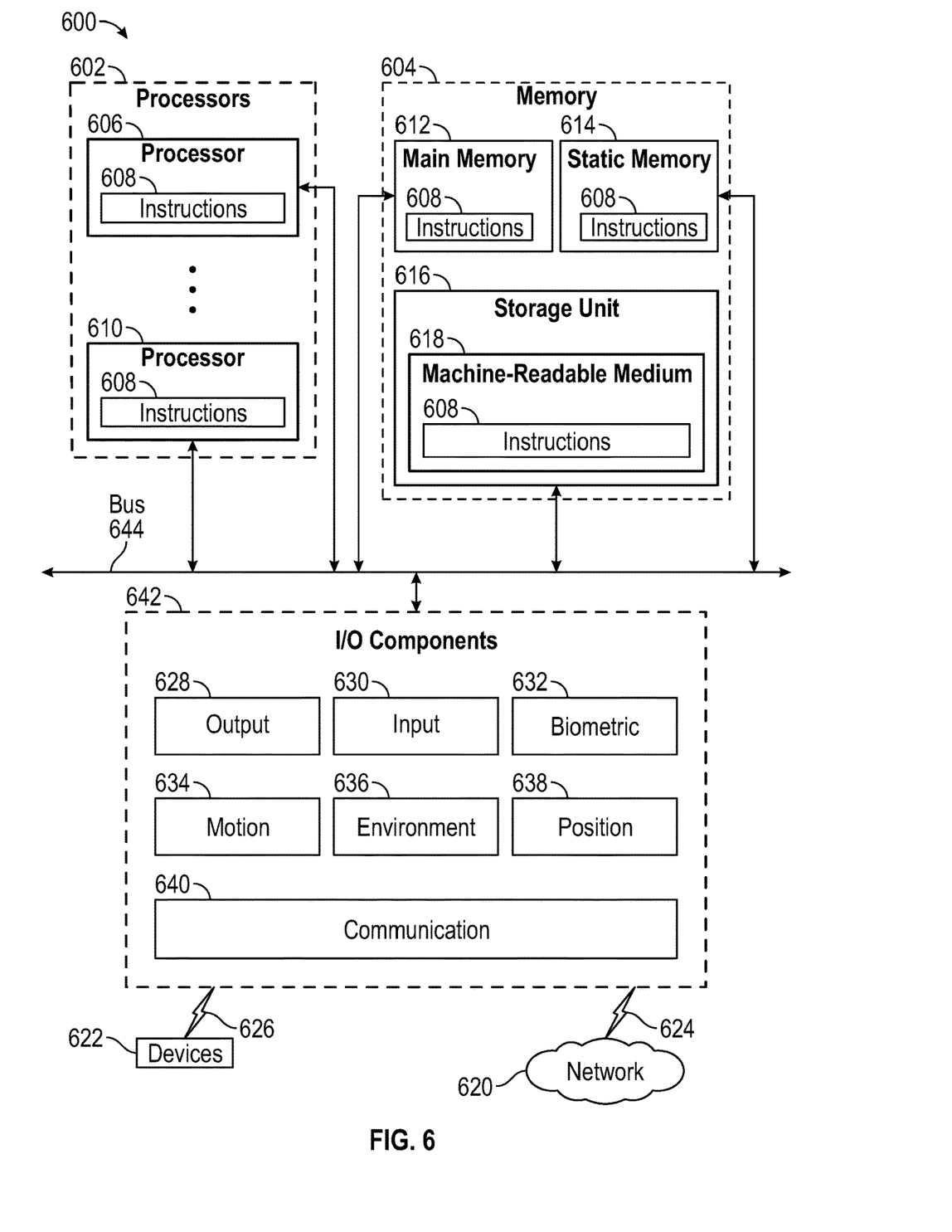
FIG. 6 illustrates a function block diagram of an example hardware configuration of a network node within which a portion of the examples of present disclosure may be implemented.

FIG. 6 is a diagrammatic representation of a machine 600 within which instructions 608 (e.g., software, a program, an application, an applet, an app, or other executable code) for causing the machine 600 to perform any one or more of the methodologies discussed herein may be executed. For example, the instructions 608 may cause the machine 600 to execute any one or more of the methods described herein. The instructions 608 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines that individually or jointly execute the instructions 608 to perform any one or more of the methodologies discussed herein.

The machine 600 may include processors 602, memory 604, and I/O components 642, which may be configured to communicate with each other via a bus 644. In an example, the processors 602 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 606 and a processor 610 that execute the instructions 608. The term "processor" is intended to include multi-core processors that may comprise two or more independent processors (sometimes referred to as "cores") that may execute instructions contemporaneously. Although FIG. 6 shows multiple processors 602, the machine 600 may include a single processor with a single core, a single processor with multiple cores (e.g., a multi-core processor), multiple processors with a single core, multiple processors with multiples cores, or any combination thereof.

The memory 604 includes a main memory 612, a static memory 614, and a storage unit 616, both accessible to the processors 602 via the bus 644. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 (e.g., a non-transitory machine-readable storage medium) within the storage unit 616, within at least one of the processors 602 (e.g., within the processor's cache memory), or any suitable combination thereof, during execution thereof by the machine 600.

Furthermore, the machine-readable medium 618 is non-transitory (in other words, not having any transitory signals) in that it does not embody a propagating signal. However, labeling the machine-readable medium 618 "non-transitory" should not be construed to mean that the medium is incapable of movement; the medium should be considered as being transportable from one physical location to another. Additionally, since the machine-readable medium 618 is tangible, the medium may be a machine-readable device.

The I/O components 642 may include a wide variety of components to receive input, provide output, produce output, transmit information, exchange information, capture measurements, and so on. The specific I/O components 642 that are included in a particular machine will depend on the type of machine. For example, portable machines such as mobile phones may include a touch input device or other such input mechanisms, while a headless server machine will likely not include such a touch input device. It will be appreciated that the I/O components 642 may include many other components that are not shown in FIG. 6. In various examples, the I/O components 642 may include output components 628 and input components 630. The output components 628 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 630 may include alphanumeric input components (e.g., a keyboard, a touch screen configured to receive alphanumeric input, a photooptical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 642 may include biometric components 632, motion components 634, environmental components 636, or position components 638, among a wide array of other components. For example, the biometric components 632 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 634 include acceleration sensor components (e.g., accelerometer), gravitation sensor components, rotation sensor components (e.g., gyroscope), and so forth. The environmental components 636 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 638 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 642 further include communication components 640 operable to couple the machine 600 to networks and client devices. For example, the communication components 640 may include a network interface component or another suitable device to interface with a network. In further examples, the communication components 640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices may be another machine or any of a wide variety of peripheral devices (e.g., a peripheral device coupled via a USB).

Moreover, the communication components 640 may detect identifiers or include components operable to detect identifiers. For example, the communication components 640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640, such as location via Internet Protocol (IP) geolocation, location via Wi-Fi® signal triangulation, location via detecting an NFC beacon signal that may indicate a particular location, and so forth.

The various memories (e.g., memory 604, main memory 612, static memory 614, memory of the processors 602), storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed examples.

The instructions 608 may be transmitted or received over the network 102, using a transmission medium, via a network interface device (e.g., a network interface component included in the communication components 640) and using any one of a number of well-known transfer protocols (e.g., hypertext transfer protocol (HTTP)). Similarly, the instructions 608 may be transmitted or received using a transmission medium via a coupling 626 (e.g., a peer-to-peer coupling) to devices.

Figure 7:
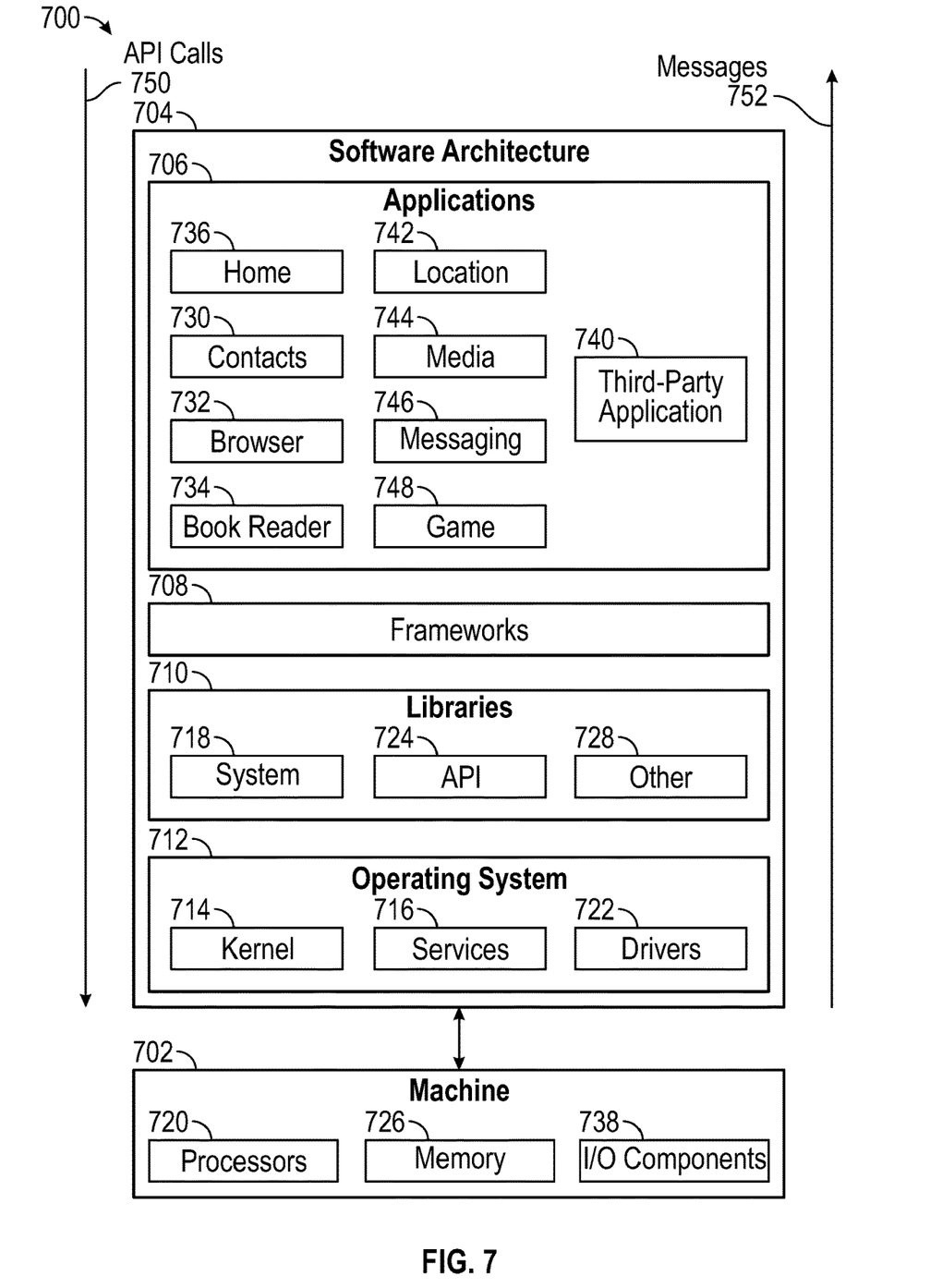
FIG. 7 illustrates a function block diagram of an example software architecture of a network node within which a portion of the examples of the present disclosure may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 710 provide a low-level common infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a high-level common infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Although the present invention has been described with reference to the examples thereof, it will be understood that the application is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system for mobile device operation system and apps delivery, comprising:
a backend server including at least one processor that executes an app delivery service module where updates of one or more feature apps are stored and executes an over-the-air module that delivers updates of the operation system and apps to the mobile device,
wherein the updates of one or more feature apps are delivered to a first user partition of an operating system image of the mobile device as a part of a system update comprising the updates of one or more feature apps and an update on the operation system,
wherein the updates of the one or more feature apps are delivered to a second user partition of the operating system image of the mobile device via the app delivery service module when the system update is not available,
wherein the updates of the one or more feature apps stored on the mobile device take precedence over older versions of the one or more feature apps stored in a same partition of the operating system image of the mobile device, and
wherein the system updates and the updates of the one or more feature apps are delivered via different cadence.

2. The system of claim 1, further comprising:
a device grouping service module where information regarding the availability of the system update is maintained.

3. The system of claim 1, further comprising:
a delta generator generating a delta image representing a difference between said system update and the operation system image of the mobile device, wherein the system update delivered is the delta image.

4. The system of claim 1, wherein the system update delivered is a delta image representing a difference between said system update and the operation system image of the mobile device.

5. The system of claim 1, further comprising:
an administration panel for the app delivery service module and an administration panel for the over-the-air module.

6. The system of claim 1, further comprising:
a system update build pipeline where the updates of one or more feature apps and the update of the operation system are built, wherein the system update is promoted over a number of stages.

7. A network for mobile device operation system and apps delivery, comprising:
a backend server including at least one processor that executes instructions to generate updates delivered to the mobile device; and
a client running on the mobile device configured to receive and install the updates;
wherein the at least one processor of the back-end server executes the instructions to implement:
an app delivery service module where updates of one or more feature apps are stored; and
an over-the-air module where updates of the operation system and apps are delivered to the mobile device,
wherein the updates of one or more feature apps are delivered to a first user partition of an operating system image of the mobile device as a part of a system update comprising the updates of one or more feature apps and an update on the operation systems,
wherein the updates of the one or more feature apps are delivered to a second user partition of the operating system image of the mobile device via the app delivery service module when the system update is not available,
wherein the updates of the one or more feature apps stored on the mobile device take precedence over older versions of the one or more feature apps stored in a same partition of the operating system image of the mobile device, and
wherein the system updates and the updates of the one or more feature apps are delivered via different cadence.

8. The network of claim 7, further comprising:
a device grouping service module where information regarding the availability of the system update is maintained.

9. The network of claim 7, further comprising:
a delta generator generating a delta image representing a difference between said system update and the operation system image of the mobile device, wherein the system update delivered is the delta image.

10. The network of claim 7, wherein the system update delivered is a delta image representing a difference between said system update and the operation system image of the mobile device.

11. The network of claim 7, further comprising:
an administration panel for the app delivery service module and an administration panel for the over-the-air module.

12. The network of claim 7, further comprising:
a system update build pipeline where the updates of one or more feature apps and the update of the operation system are built, wherein the system update is promoted over a number of stages.

13. A method for mobile device operation system and apps delivery, comprising:
developing updates of one or more feature apps;
developing a system update comprising the updates of one or more feature apps and an update on the operation system, wherein the system update and the updates of the one or more feature apps are delivered via different cadence;
receiving an inquiry from a client device regarding updates;
determining if the system update is available for the client device;
if the system update is available, delivering the system update to a first user partition of an operating system image of the client device;
if the system update is not available,
determining if updates of the one or more feature apps are available; and
delivering the updates of one or more feature apps to a second user partition of the operating system image of the client device if said updates are available; and
the mobile device giving precedence to the updates of the one or more feature apps over older versions of the one or more feature apps stored in a same partition of the operating system image of the mobile device.

14. The method of claim 13, wherein developing the system update further comprises:
generating a delta image representing a difference between said system update and the operation system image of the mobile device.

15. The method of claim 13, wherein the updates of the one or more feature apps are stored in an app delivery service module.

16. The method of claim 13, wherein the delivering of the system update and the delivering of the one or more feature apps are managed by an over-the-air module.

17. The method of claim 13, wherein determining if the system update is available for the client device is made by a device grouping service module.

* * * * *